United States Patent [19]
Nickerson

[11] Patent Number: 5,745,248
[45] Date of Patent: Apr. 28, 1998

[54] TRANSPARENT EDIT SHEET WITH ATTACHED BACKGROUND

[75] Inventor: Michael J. Nickerson, Penfield, N.Y.

[73] Assignee: Xerox Corporation, Stamford, Conn.

[21] Appl. No.: 794,602

[22] Filed: Feb. 3, 1997

[51] Int. Cl.⁶ .............. H04N 1/40; H04N 1/04; H04N 1/387; B32B 3/10
[52] U.S. Cl. .............. 358/296; 358/474; 358/453; 358/538; 428/138
[58] Field of Search .............. 358/296, 298, 358/400, 401, 406, 448, 452, 453, 471, 474, 482, 483, 488, 500, 501, 504, 505, 513, 514, 526, 530, 537, 538; 382/312, 319; 428/38, 39, 44–46, 137–139; 399/84

[56] References Cited

U.S. PATENT DOCUMENTS

| | | | |
|---|---|---|---|
| 4,567,081 | 1/1986 | VanHorne | 428/138 |
| 4,925,720 | 5/1990 | Hansen | 428/77 |
| 5,075,787 | 12/1991 | Shaughnessy et al. | 358/452 |
| 5,200,242 | 4/1993 | Hohmann | 428/40 |
| 5,331,376 | 7/1994 | Acquaviva | 355/202 |
| 5,363,212 | 11/1994 | Taniuchi et al. | 358/452 |
| 5,465,307 | 11/1995 | Azumaya et al. | 382/165 |
| 5,526,020 | 6/1996 | Campanelli et al. | 345/145 |
| 5,548,663 | 8/1996 | Sekine et al. | 382/164 |
| 5,576,847 | 11/1996 | Sekine et al. | 358/448 |
| 5,691,824 | 11/1997 | Haded et al. | 358/488 X |
| 5,696,609 | 12/1997 | Cresens et al. | 358/474 X |

*Primary Examiner*—Eric Frahm
*Attorney, Agent, or Firm*—R. Hutter

[57] ABSTRACT

A method and system segments an original image to be scanned and reproduced by a digital copier utilizing a scannable window location carrier. To realize the segmentation, an original image is inserted between a transparent portion and a highly reflective portion of the scannable window location carrier. The scannable window location carrier has a standard sheet size. An edge of the transparent portion and an edge of the highly reflective portion are permanently bonded together, and the transparent portion and the highly reflective portion are of identical lengthwise and widthwise dimensions. The transparent portion is marked so as to create a boundary outlining an area of the original image that is to be segmented from another area of the original image. The original image is removed from between the transparent portion and highly reflective portion of the scannable window location carrier, and the scannable window location carrier is scanned. An electronic window is created corresponding to the marked boundary on the transparent portion, before the original image is scanned to create a digital image thereof. The digital image is electronically segmented utilizing the electronic window created by the transparent portion of the scannable window location carrier.

9 Claims, 7 Drawing Sheets

TRANSPARENT EDIT SHEET WITH ATTACHED BACKGROUND

FIELD OF THE PRESENT INVENTION

The present invention is directed to a transparent edit sheet composite for use in providing editing information to a digital copier through a digital scanner. More specifically, the present invention is directed to a transparent sheet upon which segmenting or window marks are made and which has a highly reflective portion permanently bonded to the transparent sheet so as to provide the reflective background for the transparent sheet during scanning.

BACKGROUND OF THE PRESENT INVENTION

Traditionally, a copier, in the office equipment context, referred to a light-lens xerographic copier in which paper originals are in effect photographed, with their images focused on an area of a photoreceptor, which is subsequently developed with toner. The developed image on the photoreceptor is then transferred to a copy sheet, which in turn is used to create a permanent copy of the original.

In recent years, there has been made available what is known as a digital copier. In the most basic functions, a digital copier performs the same functions as a light-lens copier, except that the original is not directly focused on a photoreceptor. Instead, with a digital copier, the original image is scanned by a device generally known as a raster input scanner (RIS) which is typically in the form of an array of small photosensors. This array of small photosensors may either be a CCD sensor or a full width array sensor.

The original image is focused onto the photosensors in the RIS wherein the RIS and original image move relative to each other in the scanning process. More specifically, with respect to a digital copier, either the actual photosensors can move across a stationary original image, as in a platen scanning process, or the original image can be moved across a stationary set of photosensors, as in a constant velocity transport (CVT) scanning system.

The RIS coverts the various light and dark areas of the original image into a set of digital signals. These digital signals are temporarily retained in a memory and are eventually used to operate a digital printing apparatus when it is desired to print copies of the original. The digital printing apparatus can be any known type of printing system responsive to digital data, such as a modulating scanning laser or raster output scanner (ROS) which discharges image related portions of a photoreceptor or an ink jet print head.

FIG. 1 illustrates the architecture of a typical digital copier. As shown in FIG. 1, a scanning device 1 is utilized to convert the original image into a set of digital signals. These digital signals from the scanner 1 are fed to a controller 3 which may process these digital signals so as to prepare the digital image data for printing by a printer device 7. A memory 5 is also connected to the controller 3 so as to store the digital image data until it is ready to be printed by the printing device 7. The controller 3 not only processes the digital image data, but also controls the functions of the scanner 1, printer 7, and memory 5. From this basic architecture, an original image can be scanned, converted to digital image data, and reproduced as a hard copy.

One advantage of the digital system over a light-lens system is that the data derived from different areas of the original image can be processed differently. For example, if a portion of the original image is text, while another portion of the original image is a photo, the digital system can be utilized to process the image data representing the text utilizing one type of image processing operation, while processing the image data representing the photo with a different image processing operation. This segmenting of the original data into different areas of image processing operations can be realized in a variety of different ways.

One way is for the digital copier to include an auto-segmentation circuit which utilizes different algorithms to automatically classify or type the image data so that the image data can be processed properly. However, the auto-segmentation routine may not be robust or very accurate, resulting in image mis-classifications. Such mis-classifications can adversely impact the image quality of the reproduced image. For example, text within a solid background may be classified as a contone, and thus, some of the characteristics of the original text may be lost in the reproduced image.

Another way is for the user to utilize a digital edit pad or keyboard wherein the user creates various windows for the scanned image and assigns image processing operations to these created windows. This is a very difficult and time consuming process. In such a system, a user must establish coordinates for the windows which will translate into properly positioned windows for the electronic image of the original image. If the user creates incorrect coordinates, the process image will realize a reduction in image quality, in the same manner as if the image was mis-classified in an auto-segmentation system.

A third way is for the user to lay a transparency over the original document and mark the transparency so as to create accurate windows around the desired areas. This transparency is then scanned prior the scanning of the original image so that the digital copier can scan the marked windows and generate electronic windows that will be utilized when processing the scanned original image. Although this system is not automatic, it avoids the mis-classifications of the auto-segmentation system, while being more accurate than the digital edit pad system. However, this third method of establishing the boundaries for the windows cannot be utilized effectively in all digital scanning systems. This will be explained in more detail with respect to FIGS. 2 and 3 below.

FIG. 2 illustrates the scanning of an edit transparency 16 utilizing a platen scanning system 10. In the platen scanning system 10, the transparency 16, which includes the window boundary marks 15 and 17 is laid upon a platen glass 14. The platen scanning system 10 also includes a platen cover 18 which overlays the transparency 16 to provide a highly reflective background for the transparency 16, as well as, prevents light from outside the scanning system from interfering with the actual scanning process.

As illustrated in FIG. 2, a scanning mechanism 12 is moved across the stationary transparency 16 (positions A–D) in order to scan the entire original image, in this case the transparency 16. Moreover, FIG. 2 shows the illuminating and reflecting relationship between the scanning mechanism 12, the transparency 16, and platen cover 18. More specifically, at position D, the scanning mechanism 12 receives light reflected from the platen cover 18 wherein this light has passed through the transparency 16. On the other hand, at position C, the scanning mechanism 12 does not receive any reflected light because the mark 15 on transparency 16 has absorbed the light, and thus, the scanning mechanism 12 electronically records a mark at this position. At position B, the scanning mechanism 12 again receives light that has passed through the transparency 16 and has been reflected back from platen cover 18. Lastly, at position A, the scanning mechanism 12 does not receive any reflected light because the light has been absorbed by mark 17.

Thus, as illustrated in FIG. 2, the platen cover 18 provides a background for the transparency 16 so that the digital platen scanning system 10 can properly scan the transparency and detect the marks 15 and 17 which correspond to the window defining the area which requires special or distinct image processing operation.

Although the utilization of a transparency to create the windows for the digital copier can be effectively utilized in a platen scanning system, this method cannot be readily utilized in a constant velocity transport (CVT) scanning system. More specifically, as illustrated in FIG. 3, the CVT scanning system is a scanning system wherein a scanning mechanism 120 is held stationary while a document 160 is made to move across an area being scanned by the scanning mechanism 120 through the utilization of a roller or nip 101. In a CVT scanning system 100, the detection of the leading edge of the document is very important, since it is the document itself that is moving and not the scanning mechanism; whereas in a platen scanning system, the leading edge can be reliably predicted due to the registration edges on the platen and the stationary characteristic of the document.

To ensure detection of the leading edge of a document in a CVT scanning system, the CVT system has been darkened such that any light coming from a scanning mechanism is absorbed and not reflected back to the scanning mechanism. This is illustrated in FIG. 3 wherein the light from scanning mechanism 120 is absorbed by roller 101 and not reflected back. By darkening the interior of the CVT system 103, the CVT scanning system 100 can create a high contrast between the background of the CVT system 103 and the document 160 since the document is usually white or other type of color background.

Thus, as illustrated in FIGS. 3 and 4, the scanning mechanism 120 of the CVT scanning system 100 will not detect any light reflected from the CVT system 103 until the leading edge of the document 160 is caused to move across the area being scanned by the scanning device 120 by the nip or roller 101. At this initial transition from no reflected light to reflected light, the CVT scanning system 100 can detect the leading edge of the document being scanned.

However, if the CVT scanning system 100 is scanning a transparency, the operations described above with respect to FIGS. 3 and 4 cannot be realized. More specifically, as illustrated in FIG. 5, if the CVT scanning system 100 is scanning a transparency 16, when the leading edge of the transparency 16 passes across the area being scanned by the scanning mechanism 120, the scanning mechanism 120 does not receive any light reflected from the transparency 16 because the light passes through the transparency 16 and is absorbed by the dark background of the CVT system 103, namely the dark roller or nip 101.

Moreover, as illustrated in FIG. 6, as the transparency 16 continues to move across the area being scanned by the scanning mechanism 120, no light is reflected to the scanning mechanism 120 because the light from the scanning mechanism 120 is absorbed by the dark background of the CVT system 103. When a mark 15 representing a boundary of the window to be created is passed across the area being scanned by the scanning mechanism 120, no light is received by the scanning mechanism 120 because the light is absorbed by the mark 15. Therefore, if a transparency having the window boundaries marked thereon is passed through the CVT scanning system 100, the CVT scanning system 100 will not be able to detect the actual boundaries of the windows since, with respect to the scanning mechanism 120, the entire image being scanned was black because no light was reflected back to the scanning mechanism 120.

Therefore, it is desirable to have a method for creating windows in a digital scanning system that utilizes the advantages of a transparent medium when creating or marking the actual boundaries of the window, but also can be utilized in a CVT scanning system to take advantage of the increased speed and productivity of this scanning system. The present invention provides a vehicle which has the advantages of the transparency, while also providing a highly reflective background so that the vehicle can be properly scanned by a CVT scanning system.

SUMMARY OF THE PRESENT INVENTION

One aspect of the present invention is a scannable window location carrier having a standard sheet size. A light-transmissive portion defining an edge is permanently bonded to one edge of a reflective portion. The light-transmissive portion and said reflective portion have identical lengthwise and widthwise dimensions.

A second aspect of the present invention is a method for segmenting an original image to be scanned and reproduced by a digital copier. The original image is inserted between a light-transmissive portion and a reflective portion of a scannable window location carrier. The light-transmissive portion is marked to create a boundary outlining an area of the original image that is to be segmented from another area of the original image. The scannable window location carrier is scanned. An electronic window corresponding to the marked boundary on the light-transmissive portion is created. The original image is scanned to create a digital image thereof. The digital image utilizing the electronic window is segmented electronically.

Further advantages and features of the present invention will be realized from the detailed description of the present invention below.

DESCRIPTION OF THE PRIOR ART

In the prior art, U.S. Pat. No. 4,567,081 discloses an arrangement of transparent sheets, such as would be used with overhead projectors, with separator sheets interleaved therewith.

U.S. Pat. No. 4,925,720 discloses a transparent cover for overhead transparencies consisting of a pocket with a non-transparent mask flap which is hinged to the pocket.

U.S. Pat. No. 5,200,242 discloses a "receptor sheet" which is used to allow a laser printer or the like to print overhead projection slides.

U.S. Pat. No. 5,206,687 discloses a color copier having "area designating means" by which a user can designate an area on the original. "Copy density controlling means" associated with the copier enables an indicated portion of the original image to be copied with a copy density different from another portion of the copy.

U.S. Pat. No. 5,331,376 discloses a system for designating edit information on an original document. A pen is used on a document which is placed in a document feeder. The pen is attached to a control system by two wires, which in turn are wound around two pulleys, the displacement of which is used to calculate the location of the pen relative to the original image. The location of the pen, in turn, is used to derive the location of the indicated sub-area of the original image.

U.S. Pat. No. 5,363,212 discloses one embodiment of an edit pad system for use in a digital copier. The system relies on detecting a "marker dot" on an original image, which is interpreted for editing purposes.

U.S. Pat. No. 5,465,307, which has been incorporated by reference above, discloses a processing apparatus for recognizing an area marked with a closed loop, as would be found, for example, in using an edit pad or with direct marking of an original image. By detecting a closed loop, an editing system can recognize that the user has indicated a sub-area of the original image for special processing.

U.S. Pat. No. 5,526,020 discloses an embodiment of an editing system for a digital color copier.

U.S. Pat. No. 5,548,663 discloses a multi-color marker editing system by which a color original image is edited by means of designated markers placed on the original.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
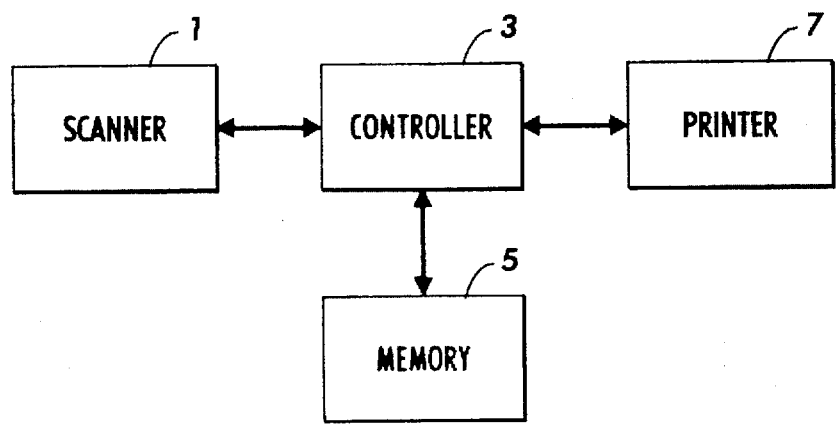
FIG. 1 is a block diagram illustrating the basic architecture of a digital copier.
Figure 2:
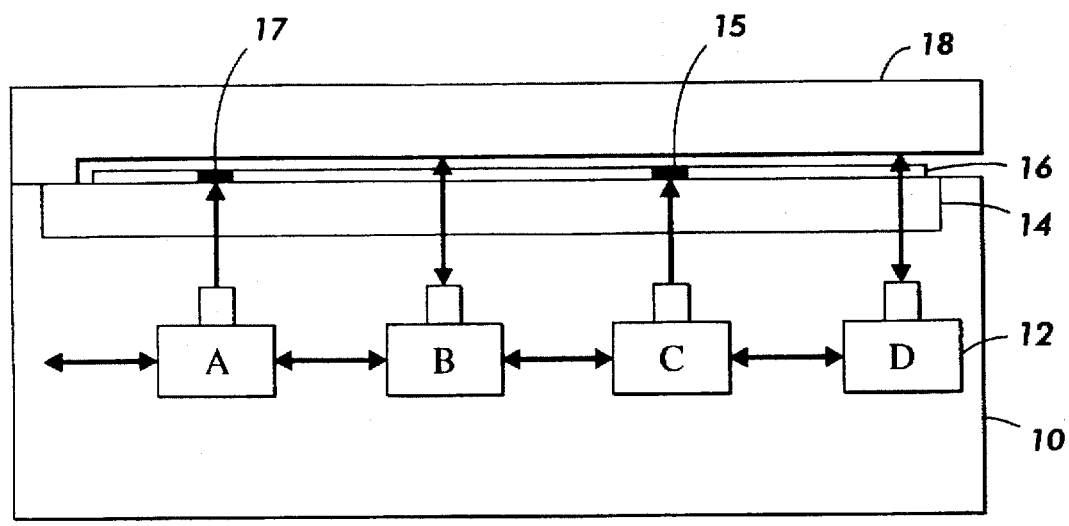
FIG. 2 illustrates a platen scanning system.
Figure 3:
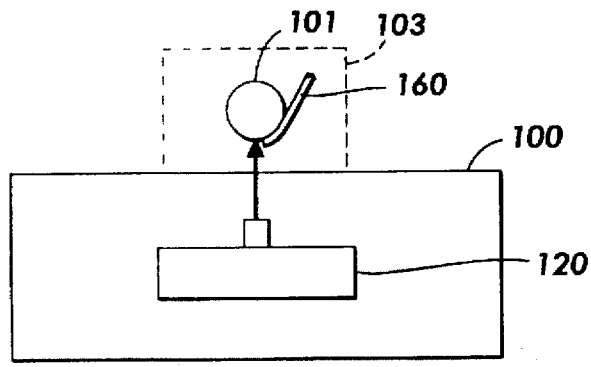
FIG. 3 illustrates a CVT scanning system.
Figure 4:
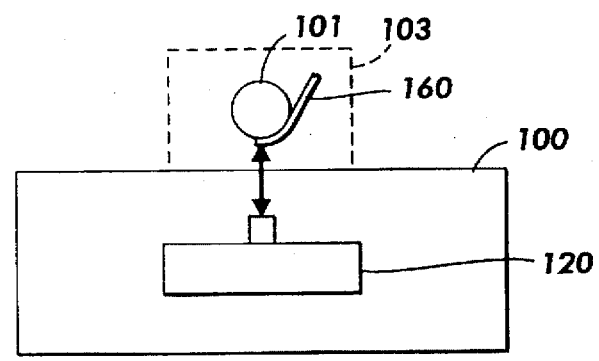
FIG. 4 illustrates the detection of the leading edge of a document by a CVT scanning system.
Figure 5:
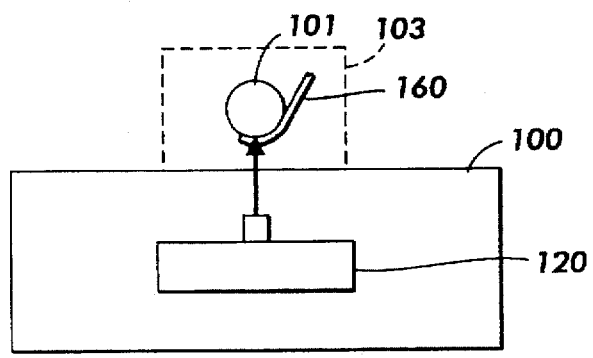
FIG. 5 illustrates the detection of a leading edge of a transparency in a CVT scanning system.
Figure 6:
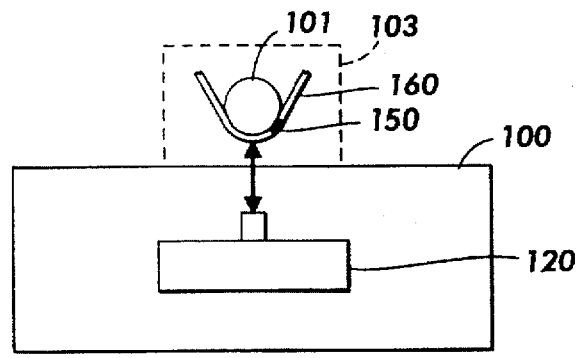
FIG. 6 illustrates the scanning of a transparency by a CVT scanning system.
Figure 7:
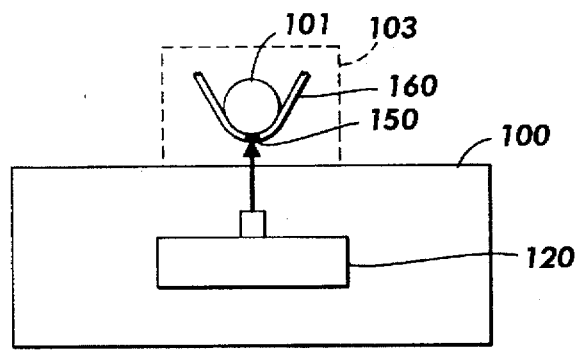
FIG. 7 illustrates the scanning of a mark on a transparency by a CVT scanning system.

The following will be a detailed description of the drawings illustrating the present invention. In this description, as well as in the drawings, like reference numbers represent like devices, circuits, or equivalent circuits which perform the same or equivalent functions.

Figure 8:
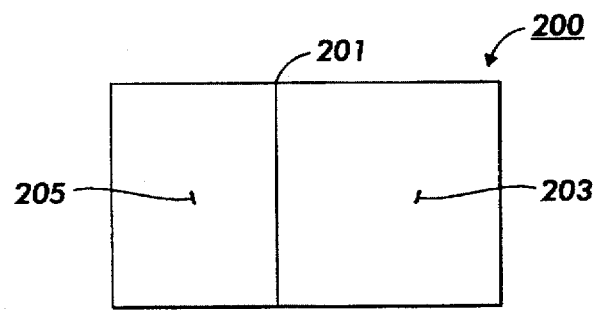
FIG. 8 illustrates a scannable window location carrier according to the concepts of the present invention.

FIG. 8 illustrates a scannable window location carrier according to the concepts of the present invention. The scannable window location carrier 200, as illustrated in FIG. 8, includes a transparent (or, more generally, light-transmissive) portion 203 and a highly reflective portion 205. In a preferred embodiment of the present invention, the transparent portion 203 is rectangular and the highly reflective portion 205 is also rectangular wherein both portions are of a standard sheet size such as 8.5 inches by 11 inches, A4, A3, 8.5 inches by 14 inches, etc.

The transparent portion 203 is permanently bonded (201) at one edge to an edge of the highly reflective portion 205. The permanent bond 201 causes the transparent portion 203 to be inseparable from the highly reflective portion 205. Moreover, the permanent bond 201 provides flexibility to the scannable window location carrier 200 such that the transparent portion 203 can be easily folded over onto to the highly reflective portion 205 such that, when in this configuration, the scannable window location carrier 200 resembles the standard document which is capable of being scanned by a digital copier or scanner. The size of this configuration, in the preferred embodiment, is a standard sheet size.

The transparent portion 203 may be any film that is typically utilized in creating transparencies. On the other hand, the highly reflective portion 205 may be a similar film type, but which has been colored or tinted so that the film's color is substantially white or very highly reflective. This coloring or tinting provides a proper background for the transparent portion 203 when the transparent portion 203 is folded over on top of the highly reflective portion 205 and fed through a digital scanner, such as a CVT digital scanning system.

Figure 9:
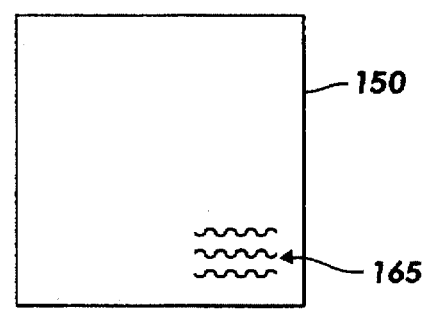
FIG. 9 illustrates an original document to be edited by a digital copier.
Figure 10:
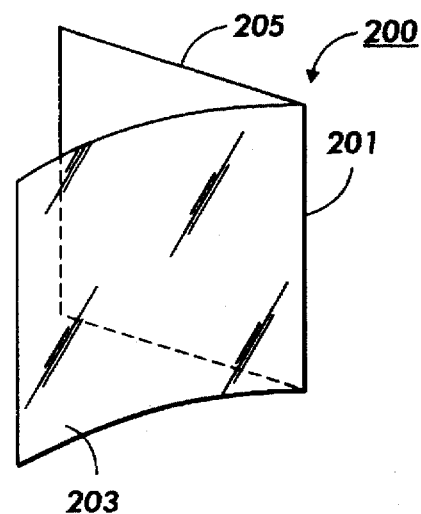
FIG. 10 illustrates another view of the scannable window location carrier accordingly to the concepts of the present invention.

To create the boundaries of the window to be utilized in processing the original image, an original document 150 having an area 165 which requires special image processing, as illustrated in FIG. 9, is inserted between the transparent portion 203 and the highly reflective portion 205 of the folded over scannable window location carrier 200 as illustrated in FIG. 10. While the original document 150 resides between the transparent portion 203 and the highly reflective portion 205, a user can make a mark around the area 165 on the transparent portion 203. The permanent bond 201 between the transparent portion 203 and highly reflective portion 205 can enable the sheet bearing the original image to be properly placed between the transparent portion 203 and the highly reflective portion 205 without undue skew within the scannable window location carrier 200.

Figure 11:
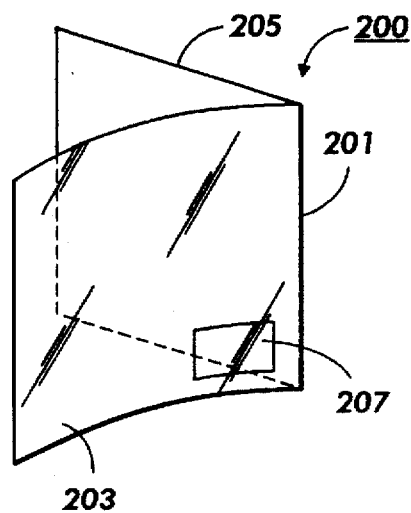
FIG. 11 illustrates a scannable window location carrier with a transparent portion being marked with the boundaries of a window.

Thereafter, the original document 150 is removed from between the transparent portion 203 and the highly reflective portion 205 leaving a scannable window location carrier, as illustrated in FIG. 11. More specifically, as illustrated in FIG. 11, the scannable window location carrier 200 now includes a marked boundary 207 representing the window corresponding, in a very accurate manner, the desired area 165 to be edited or specially processed of the original image 150.

As illustrated in FIG. 11, a mark has been drawn on the transparent portion 203 by a user indicating that the area within this marking should be edited or processed in a special manner. As shown in the present example, the mark 207 is in the form of a square which, when the original image 150 is placed inside the scannable window location carrier 200, completely encloses the area 165 of the original image. The mark 207 can be made, for example, with a wax pencil or other erasable recording material so that the mark can be wiped off after use, thereby enabling the scannable window location carrier 200 to be used multiple times.

Once the window(s) has been marked on the scannable window location carrier 200, the scannable window location carrier can now be scanned by a digital scanner or digital copier so as to input this window information into the digital system. FIGS. 12-15 illustrate the actual scanning of the scannable window location carrier by a CVT scanning system.

Figure 12:
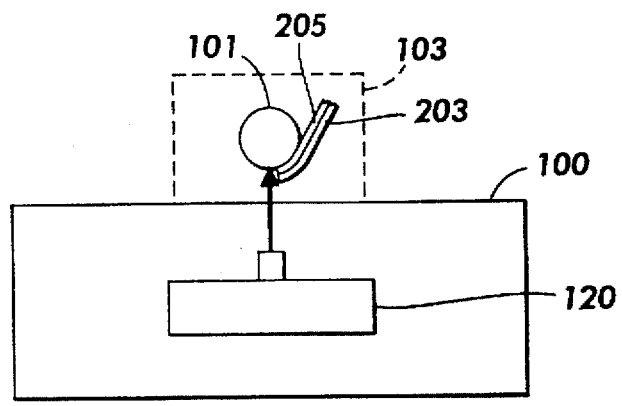
FIG. 12 illustrates scanning the scannable window location carrier prior to a detection of a leading edge of the scannable window location carrier in a CVT scanning system.

As illustrated in FIG. 12, the scannable window location carrier 200 is fed into the CVT system 103 of the CVT digital scanning system 100 in such a way that the transparent portion 203 is closest to the scanning device 120 when the scannable window location carrier passes through the area being scanned by the scanning device 120. In scanning the scannable window location carrier 200 by the scanning system 100, it is desirable that the scannable window location carrier 200 be fed with its permanent bond 201 fed first so as to minimize the possibility of jamming in the document handling equipment.

Prior to the scannable window location carrier 200 being placed in the area being scanning by the scanning device 120, the scanning device scans the interior of the CVT system 103 which has been darkened so as to provide a basis for measuring the transition when the leading edge of the document being scanned and the CVT system's background; e.g., the transition between the leading edge of the scannable window location carrier 200 scanned and the CVT system's background. This is illustrated in FIG. 12.

Figure 13:
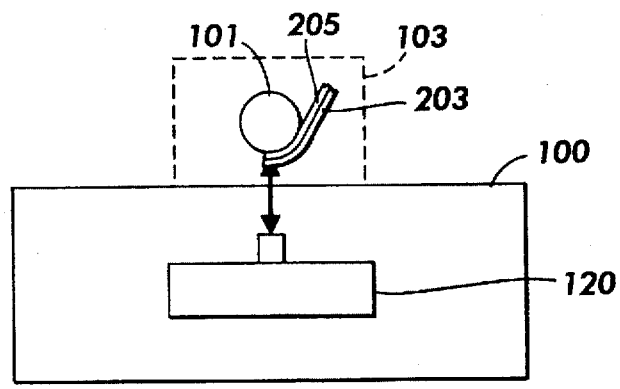
FIG. 13 illustrates the detection of a leading edge of the scannable window location carrier in a CVT scanning system.
Figure 14:
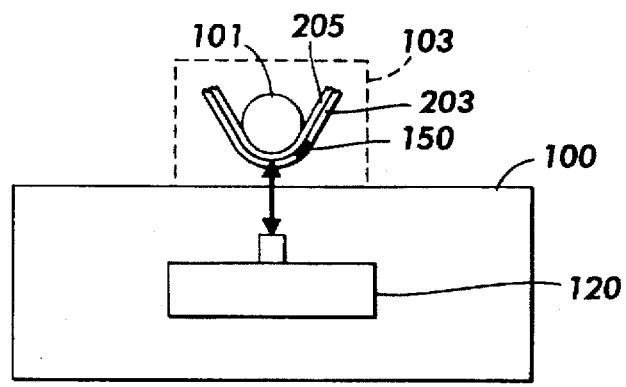
FIG. 14 illustrates the scanning of the scannable window location carrier by a CVT scanning system.

As illustrated in FIG. 13, the leading edge of the scannable window location carrier 200 crosses into the area being scanned by the scanner 120, the scanning device 120 receives light that has passed through the transparent portion 203, but has been reflected from the highly reflective portion 205, thereby indicating to the digital scanner or digital copier that the leading edge of the document has been detected. Moreover, as the scannable window location carrier 200 passes through the area being scanned by the scanning device 120, light that has passed through the transparent portion 203, but has been reflected by the highly reflective portion 205 is received by the scanning device 120 as illustrated in FIG. 14.

Figure 15:
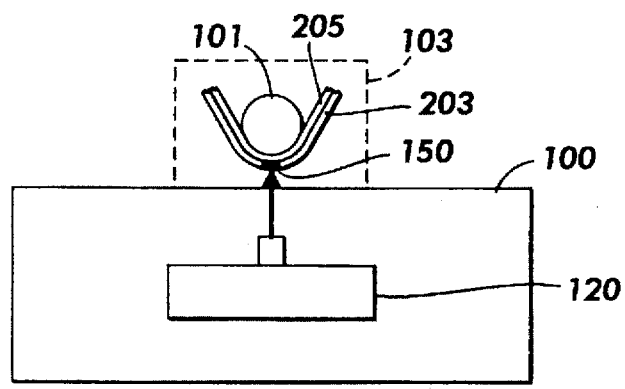
FIG. 15 illustrates the scanning of a mark on the scannable window location carrier by a CVT scanning system.

However, when a mark 15 on the transparent portion 203 which represents a portion of the boundary 207 passes through the area being scanned by the scanner 120, no light is reflected back to the scanning device 120, and thus, the digital scanner or digital copier registers the mark as a boundary location of a window. This is illustrated in FIG. 15. Thus, the scannable window location carrier 200 provides an effective vehicle for inputting window information in a digital scanner that utilizes a CVT system.

Figure 16:
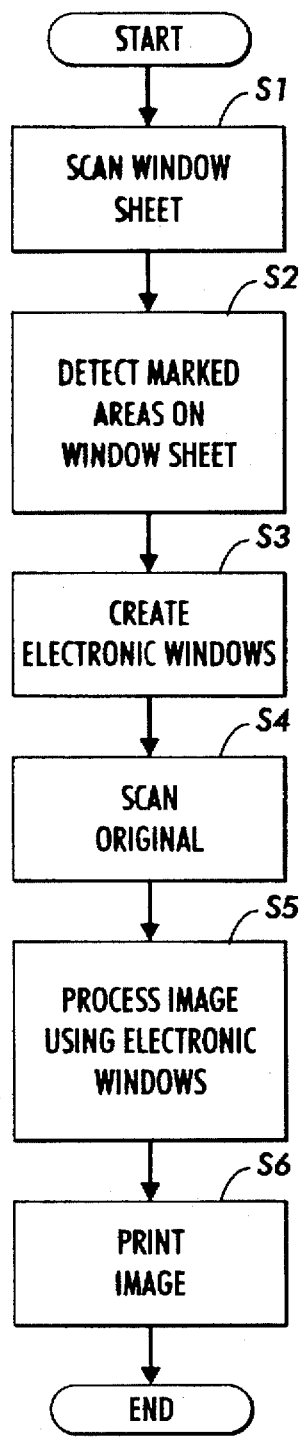
FIG. 16 is a flowchart illustrating the overall process for editing an original image scanned by a digital copier according to the concepts of the present invention.

FIG. 16 illustrates the process used to edit an original image by a digital copier or a digital scanning system according to the concepts of the present invention. As illustrated in FIG. 16, step S1 scans the scannable window location carrier. Step S2 detects the marked areas on the transparent portion of the scannable window location carrier, and from this detection, step S3 creates electronic windows corresponding to the marked areas. Once the electronic windows are created, the original image is scanned at step S4. The scanned original image is then processed at step S5 utilizing the electronic windows created in step S3, and thereafter, the original image is reproduced at step S6.

According to the present invention, the digital system, having received digital data associated with the two images, first identifies the indicated window or sub area of the original image from the scannable window location carrier 200. This identification can be performed, for example, by a system for recognizing an area mark with a closed loop and then relating such a closed loop to another image, such as is disclosed in U.S. Pat. No. 5,465,307. The entire contents of U.S. Pat. No. 5,465,307 are hereby incorporated by reference. Once an area on the scannable window location carrier 200 is identified as a window, the window is then cross referenced to an area of the same size and location in the original image 150. Such a cross referencing technique can be adapted from techniques shown, for example, in U.S. Pat. No. 5,548,663 which entire contents are hereby incorporated by reference.

FIG. 8 shows the preferred embodiment of the present invention. Possible variances to this preferred embodiment might include a special symbol indicated in an inconspicuous part of the highly reflective portion 205 or the transparent portion 203 which could be recognized by the digital scanning system as an indication that the image being currently scanned should be considered a scannable window location carrier and not the image itself that is to be copied.

As noted above, the highly reflective portion 205 is preferably colored white so as to allow for maximum optical acuity for the transparent portion 203. However, one possible variation is to make the highly reflective portion 205 a unique color, or to tint the transparent portion 203 a unique color, which the digital scanning system could recognize as being characteristic of a scannable window location carrier as opposed to an original image.

While the present invention has been described with reference to the structure disclosed above, it is not confined to the detail set forth above, but is intended to cover such modifications or changes as made, within the scope of the following claims.

What is claimed is:

1. A window location carrier scannable through a constant-velocity transport scanning system, comprising:
   a light-transmissive portion defining an edge; and
   a reflective portion having one edge thereof permanently bonded to the edge of said light-transmissive portion;
   said light-transmissive portion and said reflective portion having identical lengthwise and widthwise dimensions.

2. The scannable window location carrier as claimed in claim 1, wherein said light-transmissive portion includes marks defining a window.

3. The scannable window location carrier as claimed in claim 1, wherein said reflective portion is white.

4. The scannable window location carrier as claimed in claim 1, wherein said light-transmissive portion and said reflective portion are bonded along a lengthwise dimension relative to a direction of transport of the constant-velocity transport scanner.

5. The scannable window location carrier as claimed in claim 1, wherein said rectangular transparent portion and said rectangular highly reflective portion are bonded along a widthwise dimension relative to a direction of transport of the constant-velocity transport scanner.

6. A method for segmenting an original image to be scanned by a digital scanner, comprising the steps of:
   inserting the original image between a light-transmissive portion and a reflective portion of a scannable window location carrier;
   marking the light-transmissive portion to create a boundary outlining an area of the original image that is to be segmented from another area of the original image;
   scanning the scannable window location carrier;
   creating an electronic window corresponding to the marked boundary on the light-transmissive portion;
   scanning the original image to create a digital image thereof;
   segmenting electronically, the digital image utilizing the electronic window.

7. The method of claim 6, wherein the light-transmissive portion is permanently attached to the reflective portion of the scannable window location carrier.

8. The method of claim 6, wherein the light-transmissive portion and the reflective portion are bonded at an edge thereof along a lengthwise dimension.

9. The method of claim 6, wherein the light-transmissive portion and the reflective portion are bonded at an edge thereof along a widthwise dimension.

* * * * *